W. A. LEAHY.
VALVE SPRING HOLDER.
APPLICATION FILED AUG. 4, 1919.

1,384,472. Patented July 12, 1921.

Inventor
William A. Leahy
By Philip A. H. Sevell
Attorney

UNITED STATES PATENT OFFICE.

WILLIAM A. LEAHY, OF IMOGENE, IOWA.

VALVE-SPRING HOLDER.

1,384,472.  Specification of Letters Patent.  Patented July 12, 1921.

Application filed August 4, 1919. Serial No. 315,185.

*To all whom it may concern:*

Be it known that WILLIAM A. LEAHY, a citizen of the United States, residing at Imogene, in the county of Fremont and State of Iowa, has invented certain new and useful Improvements in Valve-Spring Holders, of which the following is a specification, reference being had therein to the accompanying drawing.

The invention relates to valve spring holders and has for its object to provide a valve spring holder, so constructed that the valve spring of an internal combustion engine may be held in compressed condition, thereby allowing the easy removal of the valve and stem, also so constructed that the spring will be held compressed while the valve is being repaired so that the spring will not have to be again compressed before replacing the same on the valve stem.

A further object is to form the holder in two sections, each section having right angle portions adapted to engage under the ends of the spring and set screw means extending through the interengaging portions of the sections whereby the sections may be securely fastened against movement after the valve spring has been compressed.

With the above and other objects in view, the invention resides in the combination and arrangement of parts as hereinafter set forth, shown in the drawings, described and claimed, it being understood that changes in the precise embodiment of the invention may be made within the scope of what is claimed, without departing from the spirit of the invention.

In the drawings:—

Figure 1:
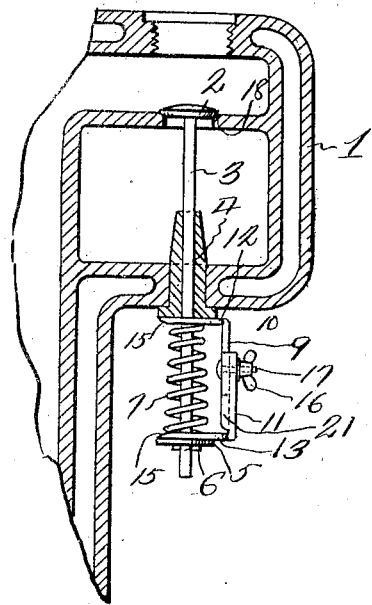
Figure 1 is a sectional view through an internal combustion engine, showing the valve and the valve spring holder applied thereto.

Referring to the drawings the numeral 1 designates a portion of an internal combustion engine and 2 a conventional form of valve, which has its stem 3 slidably mounted in a bearing 4. The lower end of the stem 3 is provided with a washer 5, said washer being supported on the valve stem 3 by a pin 6, there being a coil spring 7 disposed normally between the washer and the casing of the engine. Valve stem 3 is moved upwardly by cams which are not shown.

Figure 2:
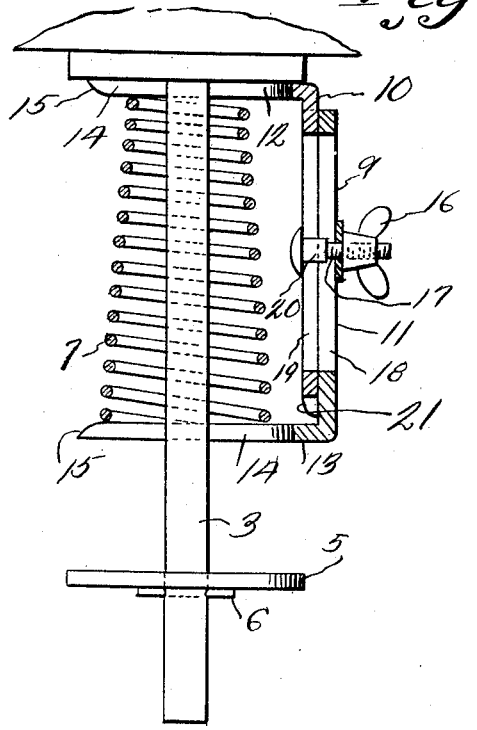
Fig. 2 is a detail sectional view of the valve holder and the valve and spring, showing the spring in compressed condition.
Figure 3:
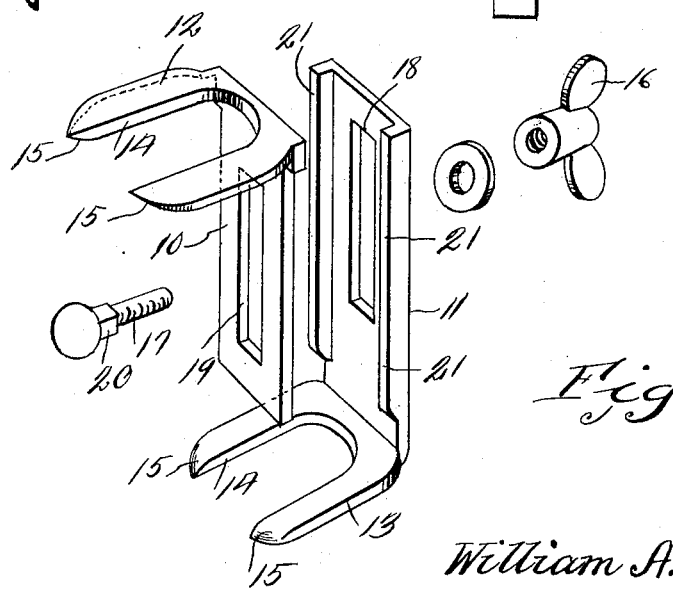
Fig. 3 is a collective view of the parts of the holder, showing them in position to be assembled.

These coil springs lose their tension and it is therefore necessary to remove the same, also it is necessary to move the coil springs for regrinding the valve seat 8 and for other repairs. To accomplish this it is necessary to compress the spring 7, then remove the pin 6 and washer 5, which is an extremely difficult task without the aid of a special tool. The valve spring holder 9 comprises two members 10 and 11 having the right angle arms 12 and 13 formed with bifurcations 14 adapted to receive the valve stem 3 when the tapered ends 15 of the arms formed by said bifurcation are forced over the ends of the coil spring 7 between the casing of the engine and the adjacent end of the coil spring and between the washer 5 and the lower end of the coil spring. After the spring holder has been placed in the position as shown in Fig. 1 the parts are forced together to the desired degree as shown in Fig. 2, then the thumb nut 16 is screwed up on the bolt 17, said bolt 17 passing through slots 18 and 19 in the vertical portions of the sections 10 and 11 of the holder, said bolt 17 being provided with a square portion 20 for preventing rotation of the same in the slots 18 and 19. Section 11 along the marginal edges of the vertical portion is provided with flanges 21 which prevent the displacement of the vertical portion of the section 10, said flanges preventing wabbling of the sections 10 and 11 in relation to each other, thereby maintaining bifurcations 14 in vertical alinement with each other. The spring having been compressed and clamped in compressed condition, the pin 6 is removed and also the washer 5, then the spring holder and spring are removed from the valve stem 3 and the valve reground. After the valve has been reground, the spring is replaced, the washer and pin placed on the end of the valve stem 3, then the thumb nut 16 is unscrewed which allows the coil spring to expand after which the holder as a whole is removed from the spring.

From the above it will be seen that a holder is provided wherein the coil spring will be held at all times and one wherein it will not be necessary when replacing the spring to again compress the same.

The invention having been set forth what is claimed as new and useful is:—

A valve spring holder comprising two right angle members, the horizontal arms of each right angle member being provided with bifurcations forming recesses for the reception of a valve stem and arms for engaging the ends of a valve spring, the vertical arms of the angle members having longitudinally disposed slots therein registering with each other, a headed bolt passing through said slots and provided with a rectangular shaped portion adjacent its head and disposed in the slots, the shank of said headed bolt being threaded and provided with a nut whereby the parts may be clamped together, and flanges carried by the vertical edges of the outer vertical arm and engaging the sides of the inner vertical arms and preventing movement of the arms out of registration with each other sidewise, said bolt forming means for maintaining said vertical arms in engagement with each other frictionally and allowing said arms to be easily detached.

In testimony whereof I hereunto affix my signature.

WILLIAM A. LEAHY.